United States Patent Office 3,148,208
Patented Sept. 8, 1964

3,148,208
PROCESS FOR RECOVERY OF DIMETHYL TEREPHTHALATE FROM POLYETHYLENE TEREPHTHALATE
Erhard Siggel, Laudenbach am Main, Lothar Riehl, Oberbruch, Rhineland, Rudolf Lotz, Obernburg am Main, and Gerhard Wick, Erlenbach am Main, Germany, assignors to Vereinigte Glanzstoff-Fabriken AG., Wuppertal-Elberfeld, Germany
No Drawing. Filed Jan. 5, 1962, Ser. No. 164,591
Claims priority, application Germany Jan. 12, 1961
9 Claims. (Cl. 260—475)

This invention relates to a process for the recovery of dimethyl terephthalate, i.e. the dimethyl ester of terephthalate acid, from polyethylene terephthalate, and more particularly to an especially effective and improved method of regenerating the dimethyl terephthalate in a very pure form for reuse in the production of filamentary products. The process of the invention is especially useful in the treatment of polyethylene terephthalate as a polyester waste product in the form of badly dyed or otherwise spoiled waste materials, including filaments, fibers, tapes, films, fabrics and the like. In addition, the present invention is concerned with a method for the direct recovery of dimethyl terephthalate in a manner which is readily adapted to continuous operation.

A number of methods have been proposed in the prior art for the treatment of polyethylene terephthalate whereby this polyester can be degraded into a monomeric material suitable for recondensation into the polyester. For example, a depolymerization reaction has been carried out in which the polyethylene terephthalate is converted into terephthalic acid diglycol ester by means of boiling glycols. However, experience has shown that the resulting diglycol ester can only be purified with extreme difficulty. According to another known process, polyethylene terephthalate is completely decomposed into terephthalic acid by treatment with strong mineral acids. Again, the precipitated terephthalic acid product is very contaminated with impurities which are difficult to remove, and in addition, the acid must again be esterified with methanol before it can be reemployed in a condensation process. It has further been proposed that polyethylene terephthalate be converted into the dimethyl ester by reaction with methanol vapors under temperature and pressure conditions which both depolymerize the polyester and split off ethylene glycol while re-esterifying with methanol. This process has been carried out by adding catalysts and avoiding high temperatures and pressures which are known to cause a severe thermal decomposition of the polyester. The prior art also describes the addition of high-boiling organic compounds for the purpose of swelling the polyester and obtaining a more complete reaction.

All of the previously known processes lead to a terephthalic acid dimethyl ester or similar monomeric product which is precipitated in a contaminated form which is not fully suitable for recondensation to a filament-forming polyester. In order to obtain the essential filament properties, an extremely pure polyester must be employed. Therefore, it has generally been necessary to employ various purifying operations such as recrystallization or fractional distillation of the monomeric product, and such purifying steps are extremely expensive and lead to a sufficiently purified product only with a substantial loss of yield. In addition, prior processes for treating polyethylene terephthalate for recoverey of the dimethyl ester require relatively long reaction times for the decomposition of the polyethylene terephthalate as well as additional reaction times for other steps in the process. As a result, it has been very difficult to develop a suitable process which can be easily adapted to continuous operation, especially where the dimethyl terephthalate end product can be immediately used for recondensation and spinning of filaments.

One object of the present invention is to provide an improved process for recovering dimethyl terephthalate from polyethylene terephthalate by a very rapid reaction and a relatively simple separating procedure, whereby the end product need not be subjected to additional purifying steps.

Another object of the invention is to provide a process which is very well suited for continuous operation.

Still another object of the invention is to provide an improved method of salvaging waste polyethylene terephthalate by removing all impurities in a number of combined steps, all impurity removing steps occurring before the dimethyl terephthalate product is precipitated in substantially pure form. In this respect, methanol and ethylene glycol are comparatively easily separated from dimethyl terephthalate so that it is an object of the invention to treat polyethylene terephthalate in such a manner that one obtains a final mixture consisting essentially of methanol, ethylene glycol and dimethyl terephthalate.

The following detailed description will illustrate these and other objects and advantages which result from the present invention.

It has now been found, in accordance with the invention, that dimethyl terephthalate can be recovered in a very pure state if polyethylene terephthalate is intimately mixed or finely dispersed with excess methanol, and the mixture is reacted at a pressure of about 80 to 140 atmospheres, preferably 100 to 120 atmospheres, and at a temperature of from about 280° C. to 340° C., preferably 300° C. to 320° C. It is essential for the purposes of the invention to obtain a very thorough and complete mixing of the polyester with the methanol, and it is also essential to operate under temperature and pressure conditions at which methanol is in its super-critical state, i.e. above the critical pressure and critical temperature of methanol.

The reaction of the invention can of course be carried out with a relatively pure polyethylene terephthalate, but the invention is particularly useful for treating polyethylene terephthalate waste products containing a large variety of impurities, including dyes, pigments, textile auxiliary agents, and the like. In order to completely remove impurities from such waste products, the polyethylene terephthalate should first be treated with steam which has been superheated to a temperature of preferably about 280° C. to 450° C., after which the polyethylene terephthalate can be finely dispersed in methanol as a powder or thoroughly mixed in its molten state by injection into a reaction vessel containing the methanol. In all cases, it is preferred to employ a high-pressure reaction vessel or tube which contains conventional mixing devices to insure the complete intermixing of the reaction materials.

In recovering the reaction products, a gaseous mixture is first released from the reaction zone at a pressure substantially lower than the reaction pressure, preferably to about normal or atmospheric pressure. During this release in pressure, it is important to simultaneously heat the reaction products in order to prevent condensation of methanol, ethylene glycol or dimethyl terephthalate. Also, by maintaining the temperature sufficiently high, it is possible to first separate non-gaseous impurities, including both solids and liquid substances which are in the form of vapors or mists. The resulting gaseous mixture, after removal of non-gaseous impurities, is then fractionally cooled so as to first remove high-boiling gaseous impurities and then to obtain a condensed fraction consisting essentially of methanol, ethylene glycol and dimethyl terephthalate. The dimethyl terephthalate is slowly crystallized from the final condensed fraction and can be simply and completely separated from the remaining ethylene glycol and methanol.

The present invention requires a very intimate mixing of the polyethylene terephthalate with methanol under conditions which will avoid the use of any other active substances in carrying out the reaction. Accordingly, the reaction mixture of this invention consists essentially of polyethylene terephthalate and methanol, it being understood that the polyester will contain varying but small amounts of different impurities. In general, the content of impurities does not amount to more than 5% and is usually less than 1 or 2%.

The use of steam, especially in its superheated state, is especially suitable for an initial intense heating of a crude or waste polyethylene terephthalate textile material. By careful treatment of the polyester with superheated steam, it is possible to bring the polyester into a brittle form which facilitates a mechanical reduction into finely divided particles, for example, by a conventional grinding operation. In addition, the treatment with superheated steam volatilizes and removes certain textile auxiliaries such as oily finishing and preparation agents which tend to cling to filamentary waste products.

The steam treatment of the invention is especially important as an initial or preparatory step in achieving a supply of polyethylene terephthalate to a reaction vessel in finely distributed form and in intimate admixture with methanol as the reaction partner.

According to one embodiment of the invention, the polyethylene terephthalate is permitted to cool after contact with superheated steam and the resulting brittle product is mechanically reduced to a small particle size of preferably about 0.025 to 0.1 millimeters. With this small sized particle, the polyester can be excellently suspended and finely dispersed in excess liquid methanol, and the suspension can be supplied directly to the reaction vessel. However, it is also possible to carry out a treatment with superheated steam so that the polyethylene terephthalate is obtained in a molten state, and without cooling, the molten material can be injected by a spray nozzle or the like into the reaction vessel containing methanol, thereby producing the desired mixture only within the reaction vessel.

The initial conditioning of the polyethylene terephthalate with superheated steam is preferably carried out in a continuous manner by passing the polyester through a heating zone in countercurrent contact with the steam. The steam temperature as it enters the heating zone should be about 280° C. to 450° C., but over the entire heating zone, the temperature of the steam may drop to a level of about 200° C. to 270° C. When it is desired to obtain polyethylene terephthalate in powder form, the temperature of the steam can be sufficiently low or the treatment time sufficiently short so that the temperature of the polymer does not rise above its melting point. It is preferable to heat the polyester for a period of time such that its relative viscosity is lowered to a value of below about $\eta_{rel}$ 1.4, preferably below about 1.3 and not lower than about 1.1. The steam treatment can also be carried out by continuously contacting the polyethylene terephthalate with a countercurrent flow of steam at temperatures of about 200° C. to 450° C. for a period of time such that the polyester temperature rises above its melting point, and the molten product can then be cooled and solidified to form a brittle product capable of being ground to a powder in an ordinary grinding mill. Alternatively, it is possible to employ the molten polyethylene terephthalate directly in the reaction with methanol, although it is much easier to work with the powdered product.

The reaction between polyethylene terephthalate and methanol under the critical conditions of the invention can be carried out in conventional vessels or reaction tubes capable of being maintained under high pressures and temperatures. By employing an elongated reaction tube or cylindrical vessel, the reactants can be introduced at one end thereof, advanced through the reaction zone, and removed by release of pressure at the opposite end. It is very helpful to equip such reaction vessels with conventional means for agitating or mixing the two reactants.

It is necessary to employ an excess by weight of methanol, and optimum results have been obtained by employing approximately four parts by weight of methanol to one part by weight of polyethylene terephthalate. It is then possible to achieve an almost complete conversion of the polyethylene terephthalate into dimethyl terephthalate. Even with a large excess of methanol, the process in continuous form is quite economical if the unreacted methanol is recovered from the final condensed fraction and recycled for the reaction with polyethylene terephthalate. A further advantage in employing excess methanol is that it acts as an entraining agent and accelerates the removal of reaction products and impurities from the reaction zone. Of course, it is possible to influence the reaction by varying the weight ratio of the reactants, but under normal technical operations on a commercial scale, the weight ratio of methanol to polyethylene terephthalate should fall within a range of about 2.5:1 to 5:1.

It was unexpectedly found that if the methanol and polyethylene terephthalate reactants are contacted under the critical temperatures and pressures of the invention for a sufficiently short period of time, then it is possible to almost completely avoid a concurrent thermal decomposition of the polyethylene terephthalate. Thus, the reaction rate between methanol and polyethylene terephthalate is so high that thermal decomposition as a side reaction can be made practically negligible. This result was especially surprising because it is known that polyethylene terephthalate decomposes at a temperature of about 300° C. or above, even if the polyester is heated in an inert atmosphere such as nitrogen. Such thermal decomposition produces undesirable by-products such as carbon monoxide, carbon dioxide and formaldehyde and generally causes a break-down in the chemical structure of the terephthalate.

It is for this reason that the prior art has always avoided very high temperatures and pressures, it being assumed that such conditions would degrade the polymer with an accompanying increase in impurities and loss of yield. Such undesirable results would occur even in the present invention except that the reaction can be completed before any substantial thermal decomposition takes place. Accordingly, the present invention is highly dependent upon the rapid reaction which occurs between methanol present in gaseous form and a liquid or molten phase of the polyester. Even where the polyester is employed as a powder in a methanol suspension, this powder is rapidly melted at the commencement of the reaction and does not tend to depress the reaction rate. By comparison, if methanol at temperatures and pressures below the critical point is simply contacted with a molten polyester, the yields are considerably less complete and much longer reaction times are required.

A depolymerization process according to the invention is also especially advantageous because it can be carried out without the addition of the usual ester-interchange and condensation catalysts. Prior processes for the recovery of dimethyl terephthalate generally require such addition of catalysts in order to obtain at least a reasonable rate of reaction. Of course, most polyethylene terephthalate waste products contain some catalysts originating from the initial production of the polyester, and it is to be expected that these catalysts will develop some catalytic effect during the reaction.

When recovering the dimethyl terephthalate product from the reaction zone, it has been found advantageous to handle the gaseous reaction mixture in a particular manner in order to obtain a complete separation of the dimethyl terephthalate product while avoiding extensive repurification. Thus, a gaseous mixture is first recovered from the reaction zone by a release in pressure to above atmospheric pressure or a correspondingly low pressure, for example, 2 to 10 atmospheres. In releasing the pressure on the gaseous mixture, heat should be simultaneously applied in order to prevent a premature condensation of methanol, ethylene glycol and dimethyl terephthalate. For example, the released gases can be initially maintained at a temperature of about 280° C. to 320° C.

Immediately after the pressure release, and without condensing any gaseous components, it is possible to remove all non-gaseous impurities including both solids and also liquids entrained in mist or vaporous form. In this connection, the terms "vapor" and "mist" are employed herein to define the presence of discrete particles of liquid suspended in a gas, and vapors and mists are to be distinguished from a true gas. The solid impurities, such as titanium dioxide or pigments and metal or metal oxide catalysts, entrained with the gaseous reaction products, are expediently removed by means of conventional separators such as baffle plates, packing materials, cyclones or the like. Liquid impurities in vaporous or mist form can likewise be removed by the use of metal fabrics or webbing placed in the flow of the reaction products.

After the non-gaseous impurities are removed from the reaction products, these products are then subjected to a fractional cooling consisting of at least two stages or separate zones. The reaction product should first be cooled only to such an extent that methanol, ethylene glycol and dimethyl terephthalate will remain in the gaseous state while higher-boiling by-products, such as ethylene terephthalate oligomers, are condensed and separated. The separation of oligomers can be accomplished in simple tubular condensers but is more advantageously accomplished by the use of conventional separating or washing columns. The temperature of this first cooling zone depends upon the weight ratio of methanol to polyethylene terephthalate, higher temperatures being required as the amount of methanol decreases. For example, with a methanol-polyethylene terephthalate ratio of 4:1, a temperature of about 200° C. to 240° C. has proven to be satisfactory. On the other hand, if this weight ratio is 3:1, it is then necessary to raise the temperature to a range of about 220° C. to 260° C. Regardless of the ratio, it is essential to avoid condensation of methanol, ethylene glycol or dimethyl terephthalate in this first cooling zone.

In a second or subsequent cooling zone, the gaseous mixture, which now consists essentially of methanol, ethylene glycol and dimethyl terephthalate, is cooled to a temperature approximately equal to the boiling point of methanol and sufficient to condense all three components. The resulting liquid condensate is then further fractionally cooled at a sufficiently slow rate such that the dimethyl terephthalate in the liquid methanol-glycol mixture is slowly precipitated with the formation of relatively large crystals. By proceeding in this manner, the dimethyl terephthalate crystals do not contain any appreciable amount of ethylene glycol trapped within the crystalline product. The liquid methanol-glycol mixture is then removed from the crystals, for example by suction filtration or by centrifuging the crystals in a liquid slurry. Small amounts of adherent glycol can be readily removed by washing with methanol, and the crystals can then be dried by a simple evaporation of the methanol. Glycol dissolved in methanol can be separated by distillation, and the recovered methanol can be again used for the depolymerization of the polyester.

It is often advantageous to remove a portion of the methanol from the reaction products just before crystallizing the dimethyl terephthalate, especially if methanol has been employed in a very large excess during the depolymerization reaction. On the other hand, methanol can also be added during fractional crystallization of the dimethyl terephthalate, since it has been proven that the dimethyl ester product contains less glycol if large amounts of methanol are present during crystallization.

The following is intended only as an illustration of the invention by example and not as the sole means of carrying out the process.

*Example I*

Polyethylene terephthalate waste in an amount of 100 kg. is passed through an elongated tube and contacted with counterflowing steam which has been superheated to a temperature of about 400° C. The steam yields a portion of its heat content to the polyethylene terephthalate and leaves the tube at a temperature of about 200° C. Textile auxiliaries in the form of oily adjuvants which tend to adhere to or coat the polyester waste are distilled off with the steam. The superheated steam is applied to the polyethylene terephthalate for a period of time sufficient to raise the temperature of the polyester above its melting point, and the molten crude polyester is collected below the heated tube and maintained in the molten state at about 280° C. This hot melt is then continuously poured onto an endless steel band and is solidified by cooling. At this point, the crude polyethylene terephthalate has become very brittle and is easily reduced in a grinding mill to a powder with fine particle sizes of between 0.025 to 0.1 mm. in diameter.

The polyester powder is next stirred into 400 kg. liquid methanol and the mixture is agitated to provide a finely dispersed suspension. This suspension is then conveyed by a pump into a coiled tube of 8 meters in length and 20 mm. in diameter, the tube being maintained under a constant temperature of about 300° C. and acting as a reaction zone. The throughput of the suspension is regulated such that 1 kg. per hour of polyethylene terephthalate is introduced into the reaction zone. A pressure of about 100 to 110 atmospheres is thereby produced in the tubular reaction zone.

At the outlet end of the reaction tube, gaseous reaction products are released to atmospheric pressure through an expansion valve into a double-walled heat exchange such that the released products are indirectly heated with a surrounding fluid medium of 315° C. By means of this heat exchange, it is possible to compensate for the heat loss of the gaseous products during expansion.

From the heat exchanger, the products are supplied to a separator in which the walls are heated and kept at a temperature of 300° C. The titanium dioxide and small amounts of other solid impurities which are entrained in the released gases become separated by means of baffle plates, and vaporous impurities entrained in mist form are collected on a metal fabric.

Thereafter, the gases originally at about 300° C. are conducted through a first cooling unit, in the form of a packed column, whereby the temperature is reduced to about 210° C. Inert packing bodies in the cooling unit serve to increase the available surface area, and high-boiling materials with a boiling point above about 210° C. are thus condensed and consist primarily of oligomeric ethylene terephthalates. These high-boiling impurities are then collected as a liquid at the lower end of the packed column, while the remaining gaseous product consisting essentially of methanol, ethylene glycol and dimethyl terephthalate are withdrawn and directed into a second cooling unit and condensed at a temperature of about 65° C.

The final condensed product is a liquid methanol-glycol mixture from which the dimethyl terephthalate is fractionally crystallized at a relatively slow rate. The dimethyl terephthalate is separated from the liquid mixture in a centrifuge, washed with methanol and dried by simple evaporation of any remaining methanol.

A very pure dimethyl terephthalate is thus obtained in an amount of 90 kg., and it is unnecessary to subject this product to any additional purification steps such as recrystallization or the like. The product can be directly recondensed in the usual manner to form polyethylene terephthalate which in turn can be spun into filaments of excellent quality.

The process of the invention is easily and inexpensively handled in a continuous manner as indicated in the foregoing example, and high yields of the pure dimethyl terephthalate product are obtained together with a high throughput per unit volume of reaction space.

The invention is hereby claimed as follows:

1. A process for the recovery of dimethyl terephthalate from polyethylene terephthalate which comprises: first contacting said polyethylene terephthalate with steam which has been superheated to a temperature of about 280° C. to 480° C. and then intimately mixing said polyethylene terephthalate with methanol in a weight ratio of methanol to polyethylene terephthalate of about 2.5:1 to 5:1 and reacting the mixture at a pressure of from about 80 to 140 atmospheres and a temperature of from about 280° C. to 340° C.

2. A process as claimed in claim 1 wherein the reaction temperature is about 300° C. to 320° C. and the reaction pressure is about 100 to 120 atmospheres.

3. A process as claimed in claim 1 wherein after being contacted with superheated steam, said polyethylene terephthalate is reduced to a particle size of about 0.025 to 0.1 millimeter and then suspended in liquid methanol for subsequent reaction of the resulting mixture.

4. A process as claimed in claim 1 wherein said mixing and reaction of polyethylene terephthalate and methanol are carried out simultaneously.

5. A continuous process for the recovery of dimethyl terephthalate from polyethylene terephthalate which comprises: continuously passing polyethylene terephthalate through a heating zone in countercurrent contact with steam which has been superheated to a temperature of about 280° C. to 450° C.; continuously introducing said polyethylene terephthalate after said contact with steam into a reaction zone together with methanol in intimate admixture such that the weight ratio of methanol to polyethylene terephthalate is about 2.51:1 to 5:1, said reaction zone being maintained at a pressure of about 80 to 140 atmospheres and a temperature of about 280° C. to 340° C.; and continuously withdrawing from said reaction zone a gaseous mixture of methanol, ethylene glycol and dimethyl terephthalate.

6. A process as claimed in claim 5 wherein the gaseous mixture being withdrawn from said reaction zone is released at a pressure substantially lower than the reaction pressure and simultaneously heated to prevent condensation of the methanol, ethylene glycol and dimethyl terephthalate while separating non-gaseous impurities, the gaseous mixture is subsequently fractionally cooled first to remove high-boiling gaseous impurities and then to obtain a condensed fraction consisting essentially of methanol, ethylene glycol and dimethyl terephthalate, and said dimethyl terephthalate is crystallized out of said condensed fraction.

7. A process as claimed in claim 5 wherein the reaction temperature is about 300° C. to 320° C. and the reaction pressure is about 100 to 120 atmospheres.

8. A process as claimed in claim 7 wherein after being contacted with superheated steam, said polyethylene terephthalate is reduced to a particle size of about 0.025 to 0.1 millimeter and then suspended in liquid methanol for subsequent reaction of the resulting mixture.

9. A process as claimed in claim 5 wherein said mixing and reaction of polyethylene terephthalate and methanol are carried out simultaneously.

References Cited in the file of this patent

UNITED STATES PATENTS

| 2,884,443 | Siggel et al. | Apr. 28, 1959 |
| 3,037,050 | Heisenberg et al. | May 29, 1962 |